(12) United States Patent
Nagatani et al.

(10) Patent No.: US 8,563,193 B2
(45) Date of Patent: Oct. 22, 2013

(54) FUEL CELL SYSTEM

(75) Inventors: Shuji Nagatani, Wako (JP); Ayatoshi Yokokawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/375,320

(22) PCT Filed: May 24, 2010

(86) PCT No.: PCT/JP2010/059161
§ 371 (c)(1),
(2), (4) Date: Nov. 30, 2011

(87) PCT Pub. No.: WO2010/140557
PCT Pub. Date: Dec. 9, 2010

(65) Prior Publication Data
US 2012/0088169 A1   Apr. 12, 2012

(30) Foreign Application Priority Data
Jun. 3, 2009   (JP) .................................. 2009-134361

(51) Int. Cl.
H01M 8/04   (2006.01)
(52) U.S. Cl.
USPC .......................................... 429/444; 429/442
(58) Field of Classification Search
USPC ....................................................... 429/440
See application file for complete search history.

(56) References Cited

U.S. PATENT DOCUMENTS

| | | | |
|---|---|---|---|
| 7,732,073 B2 | 6/2010 | Reiser | |
| 2002/0114988 A1* | 8/2002 | Iwasaki et al. | 429/34 |
| 2003/0044662 A1* | 3/2003 | Walsh | 429/26 |
| 2005/0014044 A1* | 1/2005 | Thirukkovalur et al. | 429/26 |

FOREIGN PATENT DOCUMENTS

| | | |
|---|---|---|
| JP | 62-140376 | 6/1987 |
| JP | 2007-059359 | 3/2007 |
| JP | 2007-103031 | 4/2007 |
| JP | 2007-305329 | 11/2007 |
| JP | 2007-536704 | 12/2007 |
| JP | 2008-101066 | 5/2008 |
| JP | 2009-043520 | 2/2009 |

OTHER PUBLICATIONS

Japanese Office Action and partial English translation, JP Application No. 2009-134361, mailed Apr. 16, 2013, 5 pages.

* cited by examiner

*Primary Examiner* — Ula C Ruddock
*Assistant Examiner* — Scott J Chmielecki
(74) *Attorney, Agent, or Firm* — Rankin, Hill & Clark LLP

(57) ABSTRACT

A fuel cell system includes n fuel cell modules and a control device for controlling the power generation amount of each of the fuel cell modules. An m-th fuel cell module of the fuel cell system includes an m-th exhaust gas discharge channel for discharging an exhaust gas from the m-th fuel cell module, and an m-th exhaust gas supply channel branched from the m-th exhaust gas discharge channel, for supplying the exhaust gas from the m-th fuel cell module to an (m+1)-th fuel cell module for warming up the (m+1)-th fuel cell module.

17 Claims, 6 Drawing Sheets

FIG. 4

| TOTAL | n | NATURAL NUMBER OF 2 OR MORE |
|---|---|---|
| IN OPERATION (DURING POWER OPERATION) | 1~m | 1≦m<n |
| NOT IN OPERATION (POWER GENERATION NOT PERFORMED) | (m+1)~n | — |
| TARGET POWER GENERATION AMOUNT OF m-TH FUEL CELL MODULE | Ptar(m) | — |
| CURRENT POWER GENERATION AMOUNT OF m-TH FUEL CELL MODULE | Pnow(m) | — |
| TEMPERATURE OF m-TH FUEL CELL MODULE | T(m) | — |
| TEMPERATURE OF (m+1)-TH FUEL CELL MODULE | T(m+1) | — |
| FUEL UTILIZATION RATIO OF m-TH FUEL CELL MODULE | Uf(m) | — |
| FIRST POWER GENERATION AMOUNT SET VALUE | P1 | 50 TO 70% OF RATED POWER GENERATION AMOUNT (PREFERABLY, 60%) |
| SECOND POWER GENERATION AMOUNT SET VALUE | P2 | 90 TO 100% OF RATED POWER GENERATION AMOUNT (PREFERABLY, 100%) |
| TEMPERATURE SET VALUE | T1 | 650 TO 750°C (PREFERABLY, 700°C) |
| FUEL UTILIZATION RATIO SET VALUE | Uf1 | 10 TO 80% (PREFERABLY, 70%) |

FIG. 6

| STARTING ORDER | FIRST FUEL CELL MODULE | m-TH FUEL CELL MODULE | (m+1)-TH FUEL CELL MODULE | n-TH FUEL CELL MODULE |
|---|---|---|---|---|
| PATTERN 1 | FIRST | m-TH | (m+1)-TH | n-TH |
| PATTERN 2 | n-TH | FIRST | m-TH | (m+1)-TH |
| PATTERN 3 | (m+1)-TH | n-TH | FIRST | m-TH |
| PATTERN 4 | m-TH | (m+1)-TH | n-TH | FIRST |

FUEL CELL SYSTEM

TECHNICAL FIELD

The present invention relates to a fuel cell system including a plurality of fuel cell modules operated for power generation by electrochemical reactions of a fuel gas and an oxygen-containing gas and a control device for controlling a power generation amount of each of the fuel cell modules.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

In the power supply system including the fuel cell stack of this type, for example, in order to handle change in the power demand, or in order to handle a plurality of loads, a plurality of fuel cell stacks may be used in combination.

In the power supply system disclosed in Japanese Laid-Open Patent Publication No. 2009-043520, a plurality of fuel cells and a control device are provided. The power generation amounts of the fuel cells are controlled based on a signal received by control means capable of transmitting and receiving data. The control device is capable of transmitting and receiving data to and from the control means of the fuel cells. The control device includes electrical power load detection means for detecting an electrical power load, power generation amount detection means for detecting a power generation amount of each of the fuel cells, power generation amount accumulation means for accumulating the power generation amount detected by the power generation amount detection means for a predetermined period of time in each of the fuel cells, accumulated power generation amount clearing means for clearing the accumulated power generation amount when the power generation amount accumulated by the power generation amount accumulation means exceeds a predetermined threshold, operating order determination means for determining an operating order among the fuel cells, power generation amount determination means for determining the power generation amount for each of the fuel cells based on the electrical power load detected by the electrical power load detection means and the operating order determined by the operating order determination means, and transmission means for transmitting data of the power generation amount determined by the power generation determination means to the control means related to the fuel cells. The operating order determination means places the higher priority in the operating order, on the fuel cell having the larger power generation amount accumulated by the power generation amount accumulation means.

According to the disclosure, depending on the change in the electrical power load for each of the electrical consumers, by performing power generation from the fuel cell having the highest operating order among the fuel cells, the electrical power can be supplemented between the fuel cells at the maximum rated output with the best power generation efficiency. Further, by changing the operating order periodically, the total power generation amount of the fuel cells is averaged to equalize the aging deterioration in the fuel cells, and equalize the time for carrying out the maintenance operation, replacement operation of the fuel cells or the like.

Further, Japanese Laid-Open Patent Publication No. 2007-059359 discloses a method of controlling operation of a solid oxide fuel cell system including a plurality of solid oxide fuel cell stacks operated in combination. In the method, by independently controlling the flow rate of the fuel, the flow rate of the air, and the amount of load of each of the solid oxide fuel cell stacks, the overall power generation efficiency in the system is maximized.

SUMMARY OF INVENTION

For example, in a high temperature type fuel cell such as SOFC, in order to perform power generation of the fuel cell efficiently, the fuel cell needs to be in a temperature range where thermally self-sustained operation of the fuel cell can be performed, and the fuel cell needs to be operated for power generation in the power generation amount range where the thermally self-sustained operation can be performed. The thermally self-sustained operation herein means operation where the operating temperature of the fuel cell can be maintained only using heat generated in the fuel cell without supplying additional heat from the outside.

However, in Japanese Laid-Open Patent Publication No. 2009-043520 as described above, only switching between disabling (not-operation) and enabling (operation) of the fuel cells for power generation is performed by determining the operating order. Therefore, no consideration is given to warming up of the fuel cells to the temperature range where thermally self-sustained operation can be performed, and operation of the fuel cells for power generation in the power generation amount range where thermally self-sustained operation can be performed. The technique cannot be suitably applicable to control of the SOFC.

Further, in Japanese Laid-Open Patent Publication No. 2007-059359 described above, simply, the fuel flow rate, the air flow rate and the amount of load are controlled independently. Therefore, no consideration is given to warming up of the fuel cells to the temperature range where thermally self-sustained operation can be performed, and operation of the fuel cells for power generation in the power generation amount range where thermally self-sustained operation can be performed. The technique cannot be suitably applicable to control of the SOFC.

The present invention has been made to solve the problems of this type, and an object of the present invention is to provide a fuel cell system in which fuel cells are previously warmed up to a temperature range where thermally self-sustained operation can be performed and the fuel cells are operated for power generation in the power generation amount range where thermally self-sustained operation can be performed to improve the load following capability.

The present invention relates to a fuel cell system comprising n (n is a natural number of 2 or more) fuel cell modules operated for power generation by electrochemical reactions of a fuel gas and an oxygen-containing gas, and a control device for controlling a power generation amount of each of the fuel cell modules.

In the fuel cell system, an m-th ($1 \leq m < n$: m is an natural number) fuel cell module comprises an m-th exhaust gas discharge channel for discharging an exhaust gas from the m-th fuel cell module, and an m-th exhaust gas supply channel branched from the m-th exhaust gas discharge channel, for supplying the exhaust gas from the m-th fuel cell module to an (m+1)-th fuel cell module for warming up the (m+1)-th fuel cell module.

Further, the control device comprises a fuel utilization ratio controller for controlling the fuel utilization ratio of the m-th fuel cell module based on the power generation amount of the m-th fuel cell module and the temperature of the (m+1)-th fuel cell module, an exhaust gas flow rate controller for controlling the flow rate of the exhaust gas supplied from the m-th exhaust gas discharge channel to the (m+1)-th fuel cell module through the m-th exhaust gas supply channel, and a power generation amount controller for controlling the power generation amounts of the m-th fuel cell module and the (m+1)-th fuel cell module.

In the present invention, since n fuel cell modules are provided, the operating range (power generation amount range) is expanded suitably, and the fuel cell modules can be used widely in various applications.

Further, before starting operation of the (m+1)-th fuel cell module, warming up of the (m+1)-th fuel cell module can be performed using the exhaust gas from the m-th fuel cell module which is in operation. In the structure, when the number of the operating fuel cells is increased (when the load is increased), the energy required for starting operation of the (m+1)-th fuel cell module is minimized, and improvement in the load following capability is achieved.

Further, based on the power generation amount of the m-th fuel cell module and the temperature of the (m+1)-th fuel cell module, the fuel utilization ratio of the m-th fuel cell module is controlled, and the flow rate of the exhaust gas supplied to the (m+1)-th fuel cell module is controlled.

Therefore, when the fuel utilization ratio of the m-th fuel cell module is decreased and the flow rate of the exhaust gas is increased, it becomes possible to raise the temperature of the (m+1) fuel cell module. Thus, it becomes possible to raise the temperature of the (m+1)-th fuel cell module that is not in operation to a temperature range where thermally sustained operation of the fuel cell can be performed. The thermally self-sustained operation herein means operation where the operating temperature of the fuel cell can be maintained only using heat generated in the fuel cell without supplying additional heat from the outside.

Further, since the power generation amounts of the m-th fuel cell module and the (m+1)-th fuel cell module are controlled, it becomes possible to operate the m-th fuel cell module and the (m+1)-th fuel cell module for power generation in the power generation amount range where thermally self-sustained operation can be performed.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF DRAWINGS

FIG. 4 is a table showing an operating condition of the fuel cell system;

FIG. 6 is a table showing orders of starting operation in the control method.

DESCRIPTION OF EMBODIMENTS

Figure 1:
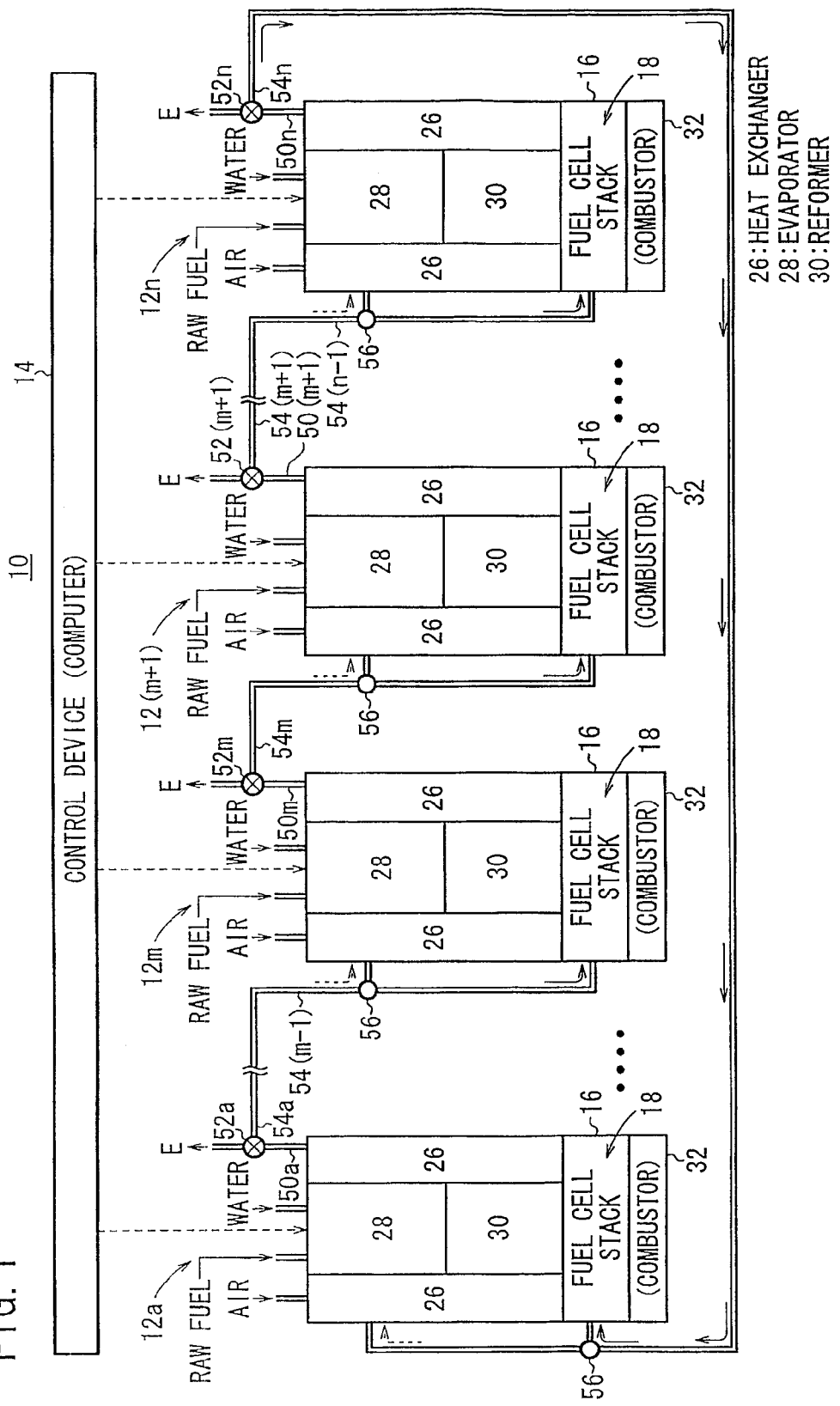
FIG. 1 is a diagram schematically showing a fuel cell system according to an embodiment of the present invention.

As shown in FIG. 1, a fuel cell system 10 according to an embodiment of the present invention includes "n" (n is an natural number of 2 or greater) fuel cell modules 12a to 12n each having a power generation capability by electrochemical reactions of a fuel gas and an oxygen-containing gas (air), and a control device 14 for controlling a power generation amount of each of the fuel cell modules 12a to 12n.

Figure 2:
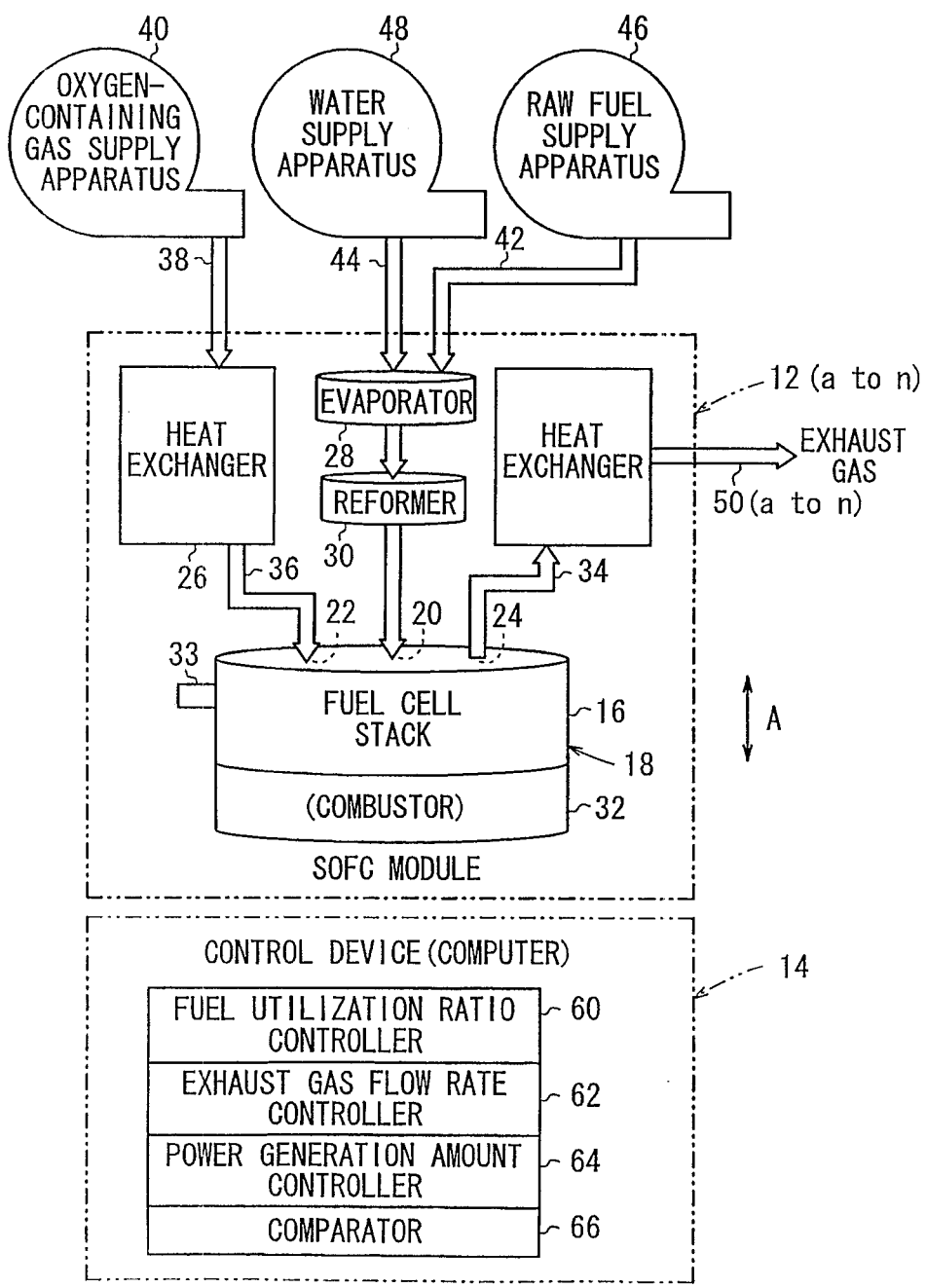
FIG. 2 is a diagram showing main components of the fuel cell system.

As shown in FIGS. 1 and 2, each of the fuel cell modules (12a to 12n (hereinafter simply referred to as the fuel cell module 12)) includes a solid oxide fuel cell stack 18 formed by stacking a plurality of solid oxide fuel cells 16. Each of the fuel cells 16 has a plurality of electrolyte electrode assemblies (MEA), and the electrolyte electrode assembly includes an anode, a cathode, and an electrolyte interposed between the anode and the cathode. For example, the electrolyte is made of ion-conductive solid oxide such as stabilized zirconia. The electrolyte electrode assemblies each have a circular disc shape, and form a sealless-type fuel cell.

As shown in FIG. 2, the fuel cell stack 18 has a fuel gas supply passage 20 defined centrally therein and extending in the stacking direction (indicated by the arrow A) of the fuel cells 16. The fuel gas supply passage 20 supplies the fuel gas to the anodes of the fuel cells 16.

The fuel cell stack 18 also has a plurality of oxygen-containing gas supply channels 22 defined in a central edge area on a circle around the fuel gas supply passage 20. The oxygen-containing gas supply channels 22 supply the air to the cathodes of the fuel cells 16. The fuel gas used in the anodes and the air used in the cathodes are discharged through exhaust gas passages 24.

At one end of the fuel cell stack 18 in the stacking direction, a heat exchanger 26 for heating the oxygen-containing gas before the oxygen-containing gas is supplied to the fuel cell stack 18, an evaporator 28 for evaporating water to generate a mixed fuel of raw fuel and water vapor, and a reformer 30 for reforming the mixed fuel to produce a reformed gas are provided.

At the other end of the fuel cell stack 18 in the stacking direction, a combustor 32 is provided as necessary. A temperature sensor 33 for detecting the temperature of the fuel cell module 12 is attached to the fuel cell stack 18.

The reformer 30 is a preliminary reformer for reforming high hydrocarbon ($C_{2+}$) such as ethane ($C_2H_6$), propane ($C_3H_8$), and butane ($C_4H_{10}$) in the city gas (raw fuel) by steam reforming to produce a fuel gas chiefly containing methane ($CH_4$), hydrogen, and CO. The operating temperature of the reformer 30 is several hundred ° C.

The operating temperature of the fuel cell 16 is as high as several hundred ° C. In the electrolyte electrode assembly, the methane in the fuel gas is reformed to produce hydrogen and CO, and the hydrogen and CO are supplied to the anodes.

The heat exchanger 26 has an exhaust gas channel 34 for passing therethrough a consumed reactant gas discharged from the fuel cell stack 18 (hereinafter also referred to as the exhaust gas) and an air channel 36 for passing therethrough air (heated fluid), such that the air and the exhaust gas flow in a counterflow manner. The downstream side of the air channel 36 is connected to the oxygen-containing gas supply channels 22 of the fuel cell stack 18, and the upstream side of the air channel 36 is connected to an oxygen-containing gas supply apparatus 40 through an air supply pipe 38.

An inlet of the evaporator 28 is connected to a raw fuel supply apparatus 46 through a raw fuel channel 42, and connected to a water supply apparatus 48 through a water channel 44. An outlet of the evaporator 28 is connected to a reformer 30, and the reformer 30 is connected to the fuel gas supply passage 20.

An exhaust gas discharge channel 50 (50a to 50n) is connected to the heat exchanger 26 for discharging the exhaust gas after heat exchange with fresh air from the fuel cell module 12. As shown in FIG. 1, an exhaust gas supply channel 54 (54a to 54n) is branched from the exhaust gas discharge channel 50 (50a to 50n) through a flow rate regulator valve (including an open/close valve) 52 (52a to 52n).

The m-th ($1 \leq m < n$: n is a natural number) fuel cell module 12m includes the m-th exhaust gas discharge channel 50m for discharging the exhaust gas from the m-th fuel cell module 12m, and the m-th exhaust gas supply channel 54m branched from the m-th exhaust gas discharge channel 50m for supplying the exhaust gas from the m-th fuel cell module 12m to the (m+1)-th fuel cell module 12(m+1) for warming the (m+1)-th fuel cell module 12(m+1).

The m-th exhaust gas supply channel 54m is connected to the (m+1)-th fuel cell stack 18 of the (m+1)-th fuel cell module 12(m+1) for supplying the exhaust gas to the fuel cell stack 18. The m-th exhaust gas supply channel 54m may be connected to the (m+1)-th heat exchanger 26 of the (m+1)-th fuel cell module 12(m+1) for supplying the exhaust gas to the heat exchanger 26. Further, the m-th exhaust gas supply channel 54m may be configured to supply the exhaust gas selectively to the fuel cell stack 18 and the heat exchanger 26 through a directional control valve 56.

In the n-th fuel cell module 12n, one end of the n-th exhaust gas supply channel 54n is branched from the n-th exhaust gas discharge channel 50n of the n-th fuel cell module 12n, and the other end of the n-th exhaust gas supply channel 54n is connected to at least one of the fuel cell stack 18 and the heat exchanger 26 of the first fuel cell module 12a.

As shown in FIG. 2, the control device 14 includes a fuel utilization ratio controller 60 for controlling the fuel utilization ratio of the m-th fuel cell module 12m based on the amount of generated electrical energy (power generation amount) in the m-th fuel cell module 12m and the temperature of the (m+1)-th fuel cell module 12(m+1), an exhaust gas flow rate controller 62 for controlling the flow rate of the exhaust gas supplied from the m-th exhaust gas discharge channel 50m to the (m+1)-th fuel cell module 12(m+1) through the m-th exhaust gas supply channel 54m, and a power generation amount controller 64 for controlling the power generation amounts of the m-th fuel cell module 12m and the (m+1)-th fuel cell module 12(m+1).

The control device 14 includes a comparator 66 for comparing the power generation amount of the m-th fuel cell module 12m with a predetermined first power generation amount set value P1, comparing the power generation amount of the m-th fuel cell module 12m with a predetermined second power generation amount set value P2 which is larger than the first power generation amount set value P1 (P1<P2), and comparing the temperature of the (m+1)-th fuel cell module 12(m+1) with a predetermined temperature set value T1.

Control operation of the fuel cell system 10 will be described with reference to a flow chart shown in FIG. 3.

For example, as shown in FIG. 4, in the fuel cell system 10, the first fuel cell module 12a to the m-th fuel cell module 12m are in operation.

Specifically, as shown in FIG. 2, in the fuel cell module 12a, by operation of the raw fuel supply apparatus 46, for example, a raw fuel such as the city gas (including $CH_4$, $C_2H_6$, $C_3H_8$, $C_4H_{10}$) is supplied to the raw fuel channel 42. Further, by operation of the water supply apparatus 48, water is supplied to the water channel 44, and the oxygen-containing gas such as the air is supplied to the air supply pipe 38 through the oxygen-containing gas supply apparatus 40.

In the evaporator 28, the raw fuel is mixed with the water vapor, and thus, a mixed fuel is obtained. The mixed fuel is supplied to the reformer 30. The mixed fuel undergoes steam reforming in the reformer 30. Thus, hydrocarbon of $C_{2+}$ is removed (reformed), and a fuel gas (reformed gas) chiefly containing methane is obtained. The fuel gas is supplied to the fuel gas supply passage 20 of the fuel cell stack 18.

The air supplied from the air supply pipe 38 to the heat exchanger 26 moves along the air channel 36 in the heat exchanger 26, and is heated to a given temperature by heat exchange with the exhaust gas which moves along the exhaust gas channel 34 as described later. The air heated by the heat exchanger 26 is supplied to the oxygen-containing gas supply channels 22 of the fuel cell stack 18.

Thus, the fuel gas is supplied to the anodes and the air is supplied to the cathodes, in each of the fuel cells 16 for generating electricity by electrochemical reactions. The exhaust gas containing the fuel gas and the air after reaction is supplied as the off gas to the heat exchanger 26 through the exhaust gas channel 34, and then, discharged to the exhaust gas discharge channel 50 (50a).

Figure 3:
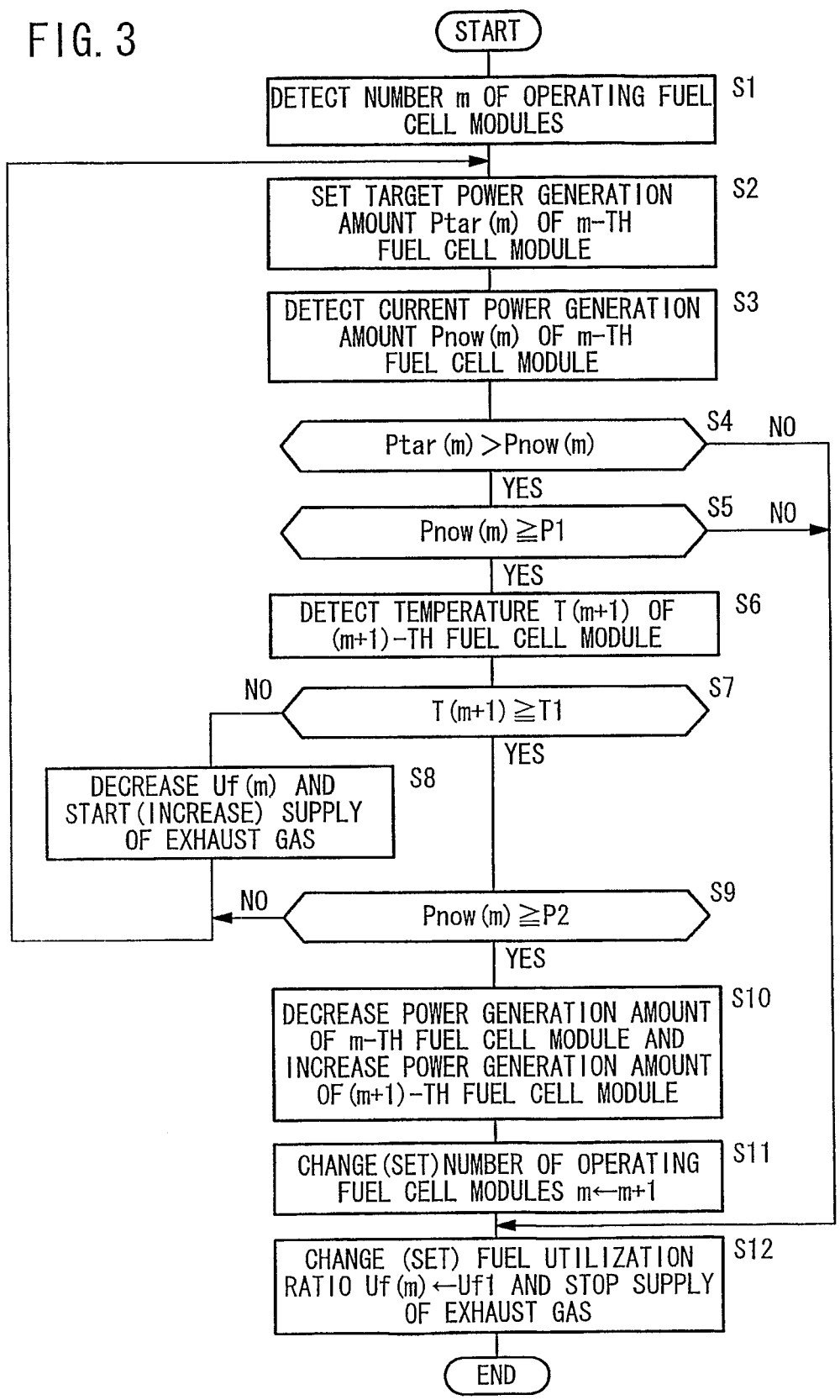
FIG. 3 is a flow chart showing a control method of the fuel cell system.

In the control device 14, firstly, the number of fuel cell modules 12 in operation in the fuel cell system 10 is detected (step S1 in FIG. 3). When it is detected that the first fuel cell module 12a to the m-th fuel cell module 12m are in operation, the process proceeds to step S2 to set a target power generation amount Ptar(m) of the m-th fuel cell module 12m. Then, the process proceeds to step S3 to detect the current power generation amount Pnow(m) of the m-th fuel cell module 12m. Alternatively, the process in step S3 may be performed before the process in step S2.

Then, in the m-th fuel cell module 12m, the target power generation amount Ptar(m) is compared with the current power generation amount Pnow(m) (step S4). If it is determined that the current power generation amount Pnow(m) is less than the target power generation amount Ptar(m) (YES in step S4), the process proceeds to step S5 to compare the current power generation amount Pnow(m) with the first power generation amount set value P1. As shown in FIG. 4, the first power generation amount set value P1 is set in a range of 50% to 70%, more preferably, at 60% of the rated power generation amount of the fuel cell module 12. The first power generation amount set value P1 functions as a heat trigger for supplying the exhaust gas to the next fuel cell module 12.

In the m-th fuel cell module 12m, if it is determined that the current power generation amount Pnow(m) is equal to or more than the first power generation amount set value P1 (YES in step S5), the process proceeds to step S6 to detect the temperature T(m+1) of the (m+1)-th fuel cell module 12(m+1).

Then, the process proceeds to step S7 for comparing the temperature T(m+1) of the (m+1)-th fuel cell module 12(m+1) with the temperature set value T1 (see FIG. 4). If it is determined that the temperature T(m+1) is less than the temperature set value T1 (NO in step S7), the process proceeds to step S8. In step S8, the fuel utilization ratio controller 60 implements control to reduce the fuel utilization ratio Uf(m) of the m-th fuel cell module 12m, and the exhaust gas flow rate controller 62 starts supply of the exhaust gas to the (m+1)-th fuel cell module 12(m+1) or increases the flow rate of the exhaust gas supplied to the (m+1)-th fuel cell module 12(m+1).

Specifically, as shown in FIG. 1, in the m-th fuel cell module 12m, the degree of the opening in the flow rate regulator valve 52m provided in the m-th exhaust gas discharge channel 50m is adjusted (or the flow rate regulator valve 52m is opened to the exhaust gas supply channel 54m), and the flow rate of the exhaust gas supplied to the m-th exhaust gas supply channel 54m is increased by the adjustment. After the above process, the process returns to step S2.

In step S7, if it is determined that the temperature T(m+1) of the (m+1)-th fuel cell module 12(m+1) is equal to or more than the temperature set value T1 (YES in step S7), the process proceeds to step S9. In step S9, the current power generation amount Pnow(m) of the m-th fuel cell module 12m is compared with the second power generation amount set value P2. As shown in FIG. 4, the second power generation amount set value P2 is set in a range of 90% to 100%, more preferably, at 100% of the rated power generation amount of the fuel cell module 12. The second power generation amount set value P2 functions as a power generation trigger for operating the next fuel cell module 12 for power generation.

Figure 5:
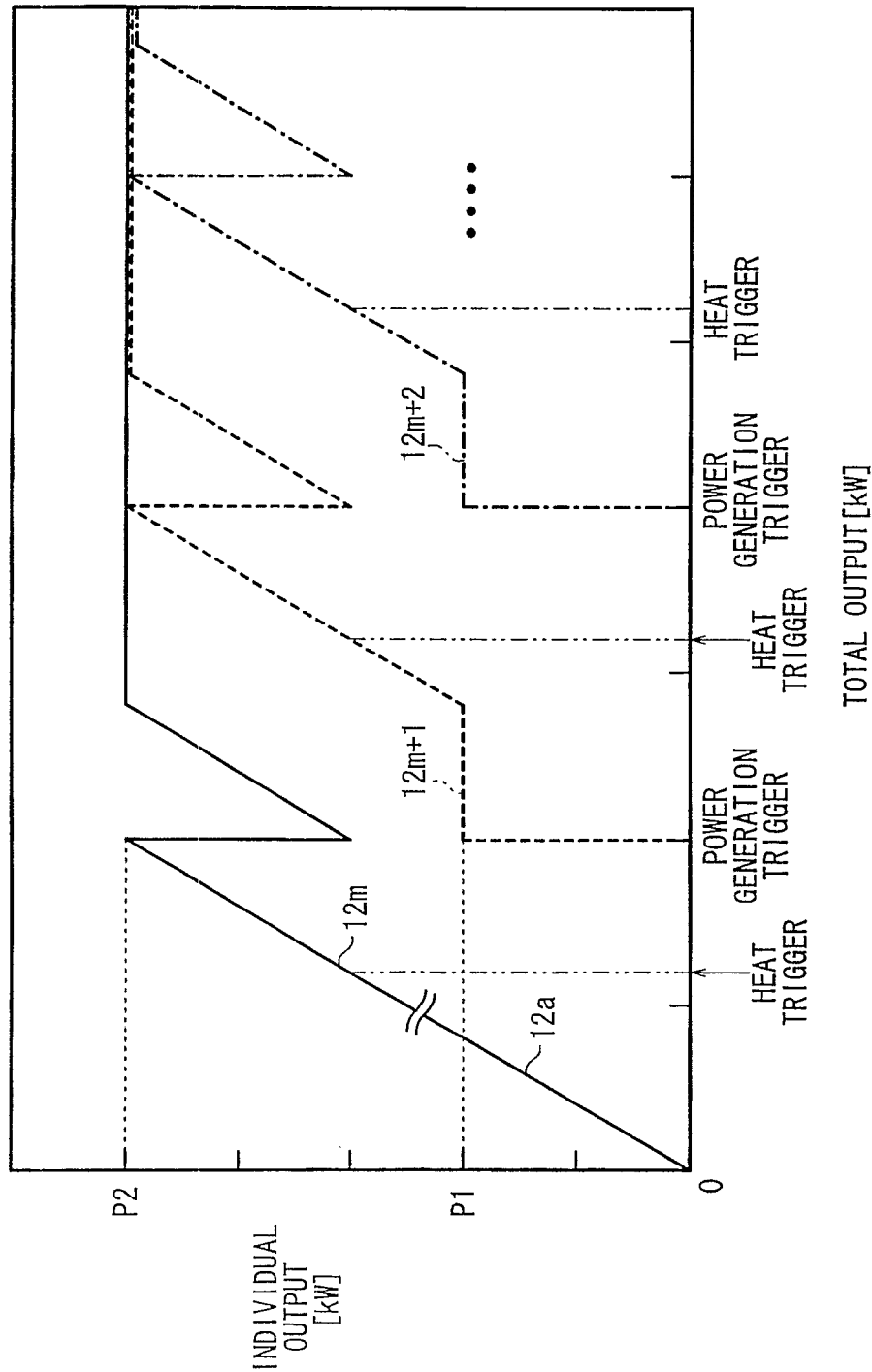
FIG. 5 is a graph showing the relationship between the individual output and total output in the control method.

In the m-th fuel cell module 12m, if it is determined that the current power generation amount Pnow(m) is equal to or more than the second power generation amount set value P2 (Yes in step S9), the process proceeds to step S10. In this step S10, the power generation amount controller 64 implements control to decrease the power generation amount of the m-th fuel cell module 12m, and increase the power generation amount of the (m+1)-th fuel cell module 12(m+1) (see FIG. 5).

Then, the control proceeds to step S11. After the setting for the number of the fuel cell modules in operation in the fuel cell system 10 is changed from m to (m+1), the process proceeds to step S12. This step S11 may be omitted.

In step S12, the fuel utilization ratio Uf(m) of the m-th fuel cell module 12m is set to the fuel utilization ratio Uf1, the degree of the opening of the flow rate regulator valve 52m is adjusted, and the supply of the exhaust gas to the m-th exhaust gas supply channel 54m is stopped. At this time, as shown in FIG. 4, the fuel utilization ratio Uf1 is set in a range of 10% to 80%, more preferably, at 70%.

Further, in step S4, when it is determined that the current power generation amount Pnow(m) is equal to or more than the target power generation amount Ptar(m) (No in step S4), and in step 5, if it is determined that the current power generation amount Pnow(m) is less than the first power generation amount set value P1 (No in step S5), the process proceeds to step S12.

In the embodiment, since the fuel cell system 10 has n fuel cell modules 12a to 12n, the operating range (range of the power generation amount) is expanded suitably, and the fuel cell system 10 can be used widely in various applications.

Further, it becomes possible to previously warm up the (m+1)-th fuel cell module 12(m+1) using the exhaust gas from the m-th fuel cell module 12m in operation, before starting operation of the (m+1)-th fuel cell module 12(m+1). Thus, when the number of fuel cell modules in operation is increased (when the load is increased), the energy required for starting operation of the (m+1)-th fuel cell module 12(m+1) can be minimized, and improvement in the load following capability is achieved.

Further, based on the current power generation amount Pnow(m) of the m-th fuel cell module 12m and the temperature T(m+1) of the (m+1)-th fuel cell module 12(m+1), the fuel utilization ratio Uf(m) of the m-th fuel cell module 12m is controlled, and the flow rate of the exhaust gas supplied to the (m+1)-th fuel cell module 12(m+1) is controlled.

Thus, when the fuel utilization ratio Uf(m) of the m-th fuel cell module 12m is decreased and the flow rate of the exhaust gas is increased, it becomes possible to raise the temperature of the (m+1)-th fuel cell module 12(m+1). Owing thereto, the temperature of the (m+1)-th fuel cell module 12(m+1) that is not in operation can be raised rapidly to a temperature range where thermally self-sustained operation can be performed. Thermally self-sustained operation herein means that the operating temperature of the fuel cell 16 is maintained using only heat generated in the fuel cell 16 without supplying additional heat from the outside.

Further, since the power generation amount is controlled in the m-th fuel cell module 12m and the (m+1)-th fuel cell module 12(m+1), it becomes possible to operate the m-th fuel cell module 12m and the (m+1) fuel cell module 12(m+1) for power generation in a power generation amount range where thermally self-sustained operation can be performed.

Further, the control device 14 includes the comparator 66 for comparing the current power generation amount Pnow(m) of the m-th fuel cell module 12m with the first power generation amount set value P1, comparing the current power generation amount Pnow(m) of the m-th fuel cell module 12m with the second power generation amount set value P2 which is larger than the first power generation amount set value P1, and comparing the temperature T(m+1) of the (m+1)-th fuel cell module 12(m+1) with the temperature set value T1.

Therefore, for example, based on the result of comparison of the current power generation amount Pnow(m) of the m-th fuel cell module 12m with the first power generation amount set value P1 (step S5) and the result of comparison of the temperature T(m+1) of the (m+1)-th fuel cell module 12(m+1) with the temperature set value T1 (step S7), the fuel utilization ratio controller 60 can implement control to decrease the fuel utilization ratio Uf(m) of the m-th fuel cell module 12m, and the exhaust gas flow rate controller 62 can implement control to increase the flow rate of the exhaust gas supplied to the (m+1)-th fuel cell module 12(m+1) (step S8).

Thus, it becomes possible to raise the temperature T(m+1) of the (m+1)-th fuel cell module 12(m+1), and rapidly raise the temperature T(m+1) of the (m+1)-th fuel cell module 12(m+1) that is not in operation to the temperature range where thermally self-sustained operation can be performed (temperature set value T1).

For example, based on the result of comparison of the temperature T(m+1) of the (m+1)-th fuel cell module 12(m+1) with the temperature set value T1 (step S7) and the result of comparison of the current power generation amount Pnow(m) of the m-th fuel cell module 12m with the second power generation amount set value P2 which is larger than the first power generation amount set value P1 (step S9), the power generation amount controller 64 can implement control to decrease the power generation amount of the m-th fuel cell module 12m, and implement control to increase the power generation amount of the (m+1)-th fuel cell module 12(m+1) (step S10).

In this manner, it becomes possible to perform power generation of the m-th fuel cell module 12m and the (m+1)-th fuel cell module 12(m+1) in the power generation amount range where thermally self-sustained operation can be performed. Further, the first power generation amount set value (heat trigger for starting warming up using the exhaust gas) P1 is less than the second power generation amount set value (power generation trigger for starting operation) P2. Therefore, it is possible to previously warm up the (m+1)-th fuel cell module 12(m+1) using the exhaust gas from the m-th fuel cell module 12m in operation, before starting operation of the (m+1)-th fuel cell module 12(m+1). Thus, when the number of fuel cell modules in operation is increased (when the load is increased), the energy required for starting operation of the (m+1)-th fuel cell module 12(m+1) is minimized, and improvement in the load following capability is achieved.

Further, in the fuel cell system 10, when the current power generation amount Pnow(m) of the m-th fuel cell module 12m is equal to or more than the first power generation amount set value P1, and the temperature T(m+1) of the (m+1)-th fuel cell module 12(m+1) is less than the temperature set value T1, the fuel utilization ratio controller 60 implements control to decrease the fuel utilization ratio Uf(m) of the m-th fuel cell module 12m, and the exhaust gas flow rate controller 62 implements control to increase the flow rate of the exhaust gas supplied to the (m+1) fuel cell module 12(m+1).

Therefore, it is possible to raise the temperature T(m+1) of the (m+1)-th fuel cell module 12(m+1), and raise rapidly the temperature T(m+1) of the (m+1)-th fuel cell module 12(m+1) that is not in operation to the temperature range where thermally self-sustained operation can be performed.

When the temperature T(m+1) of the (m+1)-th fuel cell module 12(m+1) is equal to or more than the temperature set value T1, and the current power generation amount Pnow(m) of the m-th fuel cell module 12m is equal to or more than the second power generation amount set value P2, the power generation amount controller 64 implements control to decrease the current power generation amount Pnow(m) of the m-th fuel cell module 12m, and implements control to increase the power generation amount of the (m+1)-th fuel cell module 12(m+1). Thus, it becomes possible to operate the m-th fuel cell module 12m and the (m+1)-th fuel cell module 12(m+1) in a power generation amount range where thermally self-sustained operation can be performed.

Further, the n-th fuel cell module 12n is connected to the first fuel cell module 12a through the n-th exhaust gas discharge channel 50n and the n-th exhaust gas supply channel 54n. Therefore, the fuel cell modules 12a to 12n are connected one another through the exhaust gas discharge channels 50a to 50n and the exhaust gas supply channels 54a to 54n. In the structure, operation of any of the fuel cell modules 12 (12a to 12n) can be started to operate all the fuel cell modules 12 (12a to 12n).

Thus, as shown in FIG. 6, by selecting any of the fuel cell modules 12 (12a to 12n) to be operated first, it becomes possible to equalize the operating time in each of the fuel cell modules 12 (12a to 12n), and achieve improvement in the durability of the fuel cell system 10.

Further, each of the fuel cell modules 12 (12a to 12n) at least includes the fuel cell stack 18 formed by stacking a plurality of the fuel cells 16. Each of the fuel cells 16 is formed by stacking an electrolyte electrode assembly and a separator. The electrolyte electrode assembly includes an anode, a cathode, and an electrolyte interposed between the anode and the cathode. Further, the fuel cell module 12 (12a to 12n) includes the heat exchanger 26 for heating the oxygen-containing gas before the oxygen-containing gas is supplied to the fuel cell stack 18, the evaporator 28 for evaporating water to produce a mixed fuel of a raw fuel chiefly containing hydrocarbon and water vapor, and a reformer 30 for reforming the mixed fuel to produce a reformed gas. Thus, the fuel cell modules 12 (12a to 12n) can be used optimally as high-temperature-type fuel cell modules.

Further, one end of the m-th exhaust gas supply channel 54 is branched from the m-th exhaust gas discharge channel 50m of the m-th fuel cell module 12m, and the other end of the m-th exhaust gas supply channel 54m is connected to at least one of the fuel cell stack 18 and the heat exchanger 26 of the (m+1)-th fuel cell module 12(m+1).

Therefore, by connecting the other end of the m-th exhaust gas supply channel 54m to the fuel cell stack 18, it becomes possible to previously warm up the (m+1)-th fuel cell stack 18 using the exhaust gas from the m-th fuel cell module 12m in operation, before starting operation of the (m+1)-th fuel cell module 12(m+1). Thus, when the number of fuel cell modules in operation is increased (when the load is increased), the energy required for starting operation of the (m+1)-th fuel cell module 12(m+1) is minimized, and improvement in the load following capability is achieved.

Further, by connecting the other end of the m-th exhaust gas supply channel 54m to the heat exchanger 26, it becomes possible to beforehand warm up the (m+1)-th fuel cell stack 18 by means of oxygen-containing gas that flows through the (m+1)-th heat exchanger 26 using the exhaust gas from the m-th fuel cell module 12m in operation, before starting operation of the (m+1)-th fuel cell module 12(m+1). Thus, when the number of fuel cell modules in operation is increased (when the load is increased), the energy required for starting operation of the (m+1)-th fuel cell module 12(m+1) is minimized, and improvement in the load following capability is achieved.

Further, one end of the n-th exhaust gas supply channel 54n is branched from the n-th exhaust gas discharge channel 50n of the n-th fuel cell module 12n, and the other end of the n-th exhaust gas supply channel 54n is connected to at least one of the fuel cell stack 18 and the heat exchanger 26 of the first fuel cell module 12a.

Thus, since the fuel cell modules 12 (12a to 12n) are connected to one another through the exhaust gas discharge channels 50 (50a to 50n) and the exhaust gas supply channels (54a to 54n), any of the fuel cell modules 12 (12a to 12n) can be started to operate all the fuel cell modules 12 (12a to 12n).

Therefore, by selecting any of the fuel cell modules 12 (12a to 12n) to be operated first, it becomes possible to equalize the operating time in each of the fuel cell modules 12 (12a to 12n), and achieve improvement in the durability of the fuel cell system 10.

Further, preferably, the fuel cell modules 12 (12a to 12n) are solid oxide fuel cell modules. Thus, the fuel cell modules 12 (12a to 12n) can be used optimally as high-temperature-type fuel cell modules.

Although a certain preferred embodiment of the present invention has been shown and described in detail, it should be understood that various changes and modifications may be made therein without departing from the scope of the appended claims.

The invention claimed is:

1. A fuel cell system comprising:
   n (n is a natural number of 2 or more) fuel cell modules operated for power generation by electrochemical reactions of a fuel gas and an oxygen-containing gas; and
   a control device for controlling a power generation amount of each of the fuel cell modules;
   wherein an m-th ($1 \leq m < n$: m is a natural number) fuel cell module comprises:
   an m-th exhaust gas discharge channel for discharging an exhaust gas from the m-th fuel cell module; and
   an m-th exhaust gas supply channel branched from the m-th exhaust gas discharge channel, for supplying the exhaust gas from the m-th fuel cell module to an (m+1)-th fuel cell module for warming up the (m+1)-th fuel cell module,
   and wherein the control device comprises:
   a fuel utilization ratio controller that is programmed to control a fuel utilization ratio of the m-th fuel cell module based on the power generation amount of the m-th fuel cell module and a temperature of the (m+1)-th fuel cell module;
   an exhaust gas flow rate controller that is programmed to control a flow rate of the exhaust gas supplied from the m-th exhaust gas discharge channel to the (m+1)-th fuel cell module through the m-th exhaust gas supply channel; and a power generation amount controller that is programmed to control the power generation amounts of the m-th fuel cell module and the (m+1)-th fuel cell module.

2. A fuel cell system according to claim 1, wherein the control device comprises a comparator for comparing the power generation amount of the m-th fuel cell module with a predetermined first power generation amount set value, comparing the power generation amount of the m-th fuel cell module with a predetermined second power generation amount set value which is larger than the first power generation amount set value, and comparing the temperature of the (m+1)-th fuel cell module with a predetermined temperature set value.

3. A fuel cell system according to claim 2, wherein, when the power generation amount of the m-th fuel cell module is equal to or more than the first power generation amount set value, and the temperature of the (m+1)-th fuel cell module is less than the temperature set value,
the fuel utilization ratio controller implements control to reduce the fuel utilization ratio of the m-th fuel cell module, and the exhaust gas flow rate controller implements control to increase the flow rate of the exhaust gas supplied to the (m+1)-th fuel cell module; and
when the temperature of the (m+1)-th fuel cell module is equal to or more than the temperature set value, and the power generation amount of the m-th fuel cell module is equal to or more than the second power generation amount set value,
the power generation amount controller implements control to reduce the power generation amount of the m-th fuel cell module and increase the power generation amount of the (m+1)-th fuel cell module.

4. A fuel cell system according to claim 1, wherein an n-th fuel cell module is connected to a first fuel cell module through an n-th exhaust gas discharge channel and an n-th exhaust gas supply channel.

5. A fuel cell system according to claim 1, wherein the fuel cell module comprises:
a fuel cell stack formed by stacking a plurality of fuel cells, each of the fuel cells being formed by stacking at least an electrolyte electrode assembly and a separator, the electrolyte electrode assembly including an anode, a cathode, and an electrolyte interposed between the anode and the cathode;
a heat exchanger for heating the oxygen-containing gas before the oxygen-containing gas is supplied to the fuel cell stack;
an evaporator for evaporating water in order to produce a mixed fuel of raw fuel chiefly containing hydrocarbon and water vapor; and
a reformer for reforming the mixed fuel to produce a reformed gas.

6. A fuel cell system according to claim 5, wherein one end of the m-th exhaust gas supply channel is branched from the m-th exhaust gas discharge channel of the m-th fuel cell module; and
the other end of the m-th exhaust gas supply channel is connected to at least one of the fuel cell stack and the heat exchanger of the (m+1)-th fuel cell module.

7. A fuel cell system according to claim 5, wherein one end of the n-th exhaust gas supply channel is branched from the n-th exhaust gas discharge channel of the n-th fuel cell module; and
the other end of the n-th exhaust gas supply channel is connected to at least one of the fuel cell stack and the heat exchanger of the first fuel cell module.

8. A fuel cell system according to claim 1, wherein the fuel cell module is a solid oxide fuel cell module.

9. A fuel cell system according to claim 2, wherein the fuel cell module comprises:
a fuel cell stack formed by stacking a plurality of fuel cells, each of the fuel cells being formed by stacking at least an electrolyte electrode assembly and a separator, the electrolyte electrode assembly including an anode, a cathode, and an electrolyte interposed between the anode and the cathode;
a heat exchanger for heating the oxygen-containing gas before the oxygen-containing gas is supplied to the fuel cell stack;
an evaporator for evaporating water in order to produce a mixed fuel of raw fuel chiefly containing hydrocarbon and water vapor; and
a reformer for reforming the mixed fuel to produce a reformed gas.

10. A fuel cell system according to claim 9, wherein one end of the m-th exhaust gas supply channel is branched from the m-th exhaust gas discharge channel of the m-th fuel cell module; and
the other end of the m-th exhaust gas supply channel is connected to at least one of the fuel cell stack and the heat exchanger of the (m+1)-th fuel cell module.

11. A fuel cell system according to claim 9, wherein one end of the n-th exhaust gas supply channel is branched from the n-th exhaust gas discharge channel of the n-th fuel cell module; and
the other end of the n-th exhaust gas supply channel is connected to at least one of the fuel cell stack and the heat exchanger of the first fuel cell module.

12. A fuel cell system according to claim 3, wherein the fuel cell module comprises:
a fuel cell stack formed by stacking a plurality of fuel cells, each of the fuel cells being formed by stacking at least an electrolyte electrode assembly and a separator, the electrolyte electrode assembly including an anode, a cathode, and an electrolyte interposed between the anode and the cathode;
a heat exchanger for heating the oxygen-containing gas before the oxygen-containing gas is supplied to the fuel cell stack;
an evaporator for evaporating water in order to produce a mixed fuel of raw fuel chiefly containing hydrocarbon and water vapor; and
a reformer for reforming the mixed fuel to produce a reformed gas.

13. A fuel cell system according to claim 12, wherein one end of the m-th exhaust gas supply channel is branched from the m-th exhaust gas discharge channel of the m-th fuel cell module; and
the other end of the m-th exhaust gas supply channel is connected to at least one of the fuel cell stack and the heat exchanger of the (m+1)-th fuel cell module.

14. A fuel cell system according to claim 12, wherein one end of the n-th exhaust gas supply channel is branched from the n-th exhaust gas discharge channel of the n-th fuel cell module; and
the other end of the n-th exhaust gas supply channel is connected to at least one of the fuel cell stack and the heat exchanger of the first fuel cell module.

15. A fuel cell system according to claim 4, wherein the fuel cell module comprises:
a fuel cell stack formed by stacking a plurality of fuel cells, each of the fuel cells being formed by stacking at least an electrolyte electrode assembly and a separator, the electrolyte electrode assembly including an anode, a cathode, and an electrolyte interposed between the anode and the cathode;

a heat exchanger for heating the oxygen-containing gas before the oxygen-containing gas is supplied to the fuel cell stack;

an evaporator for evaporating water in order to produce a mixed fuel of raw fuel chiefly containing hydrocarbon and water vapor; and a reformer for reforming the mixed fuel to produce a reformed gas.

16. A fuel cell system according to claim 15, wherein one end of the m-th exhaust gas supply channel is branched from the m-th exhaust gas discharge channel of the m-th fuel cell module; and the other end of the m-th exhaust gas supply channel is connected to at least one of the fuel cell stack and the heat exchanger of the (m+1)-th fuel cell module.

17. A fuel cell system according to claim 15, wherein one end of the n-th exhaust gas supply channel is branched from the n-th exhaust gas discharge channel of the n-th fuel cell module; and the other end of the n-th exhaust gas supply channel is connected to at least one of the fuel cell stack and the heat exchanger of the first fuel cell module.

* * * * *